H. L. BIENER.
VEHICLE TIRE.
APPLICATION FILED NOV. 24, 1911.
1,051,307.
Patented Jan. 21, 1913.
2 SHEETS—SHEET 2.
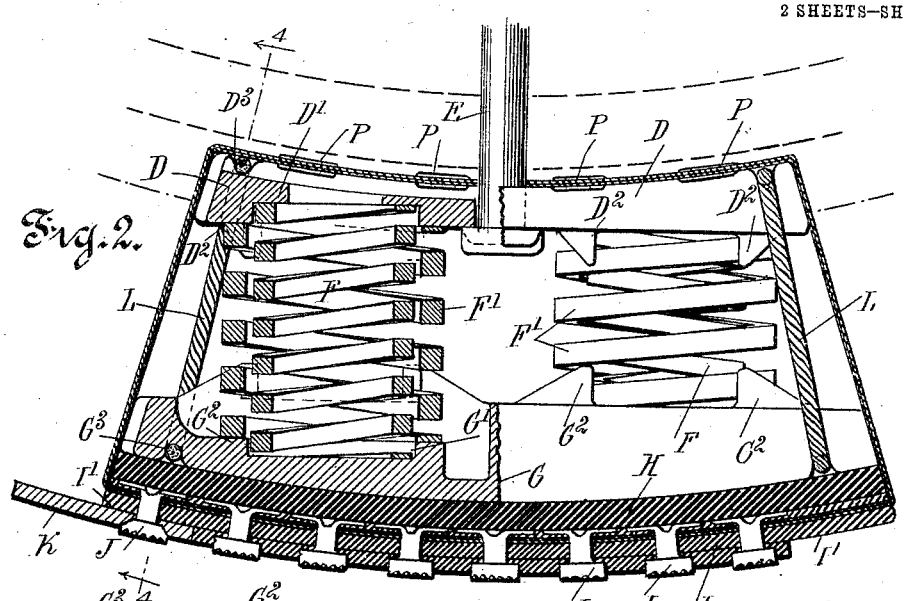
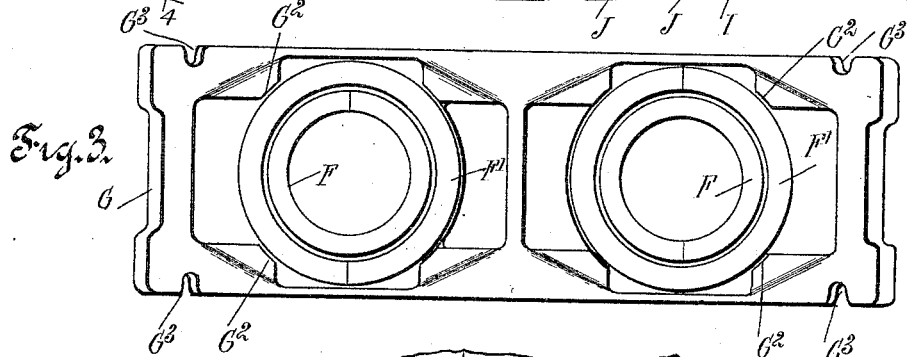
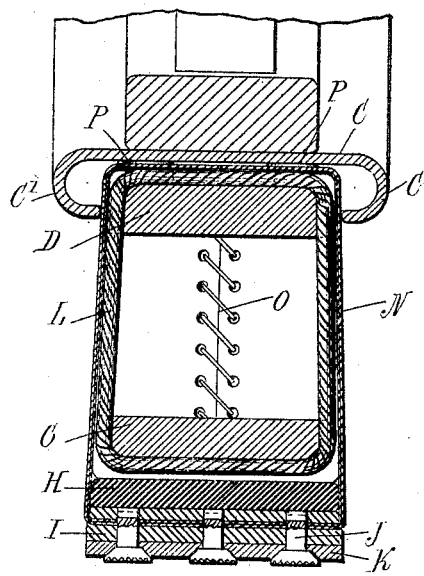
WITNESSES
INVENTOR
Herman L. Biener
BY
ATTORNEYS

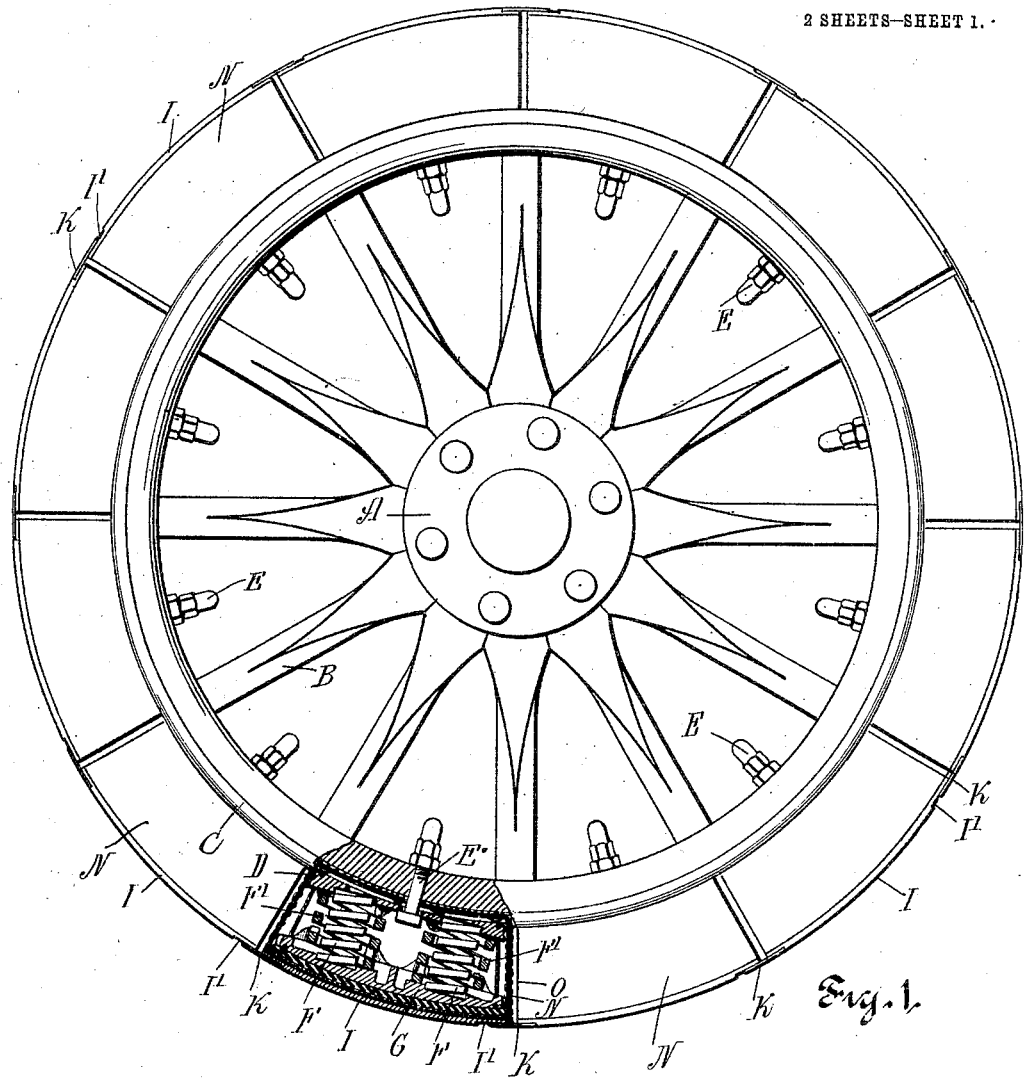

UNITED STATES PATENT OFFICE.

HERMAN L. BIENER, OF NEW YORK, N. Y., ASSIGNOR, BY DIRECT AND MESNE ASSIGNMENTS, TO AUTO SECTIONAL LEATHER TIRE COMPANY, OF NEW YORK, N. Y., A CORPORATION OF NEW YORK.

VEHICLE-TIRE.

1,051,307.         Specification of Letters Patent.      Patented Jan. 21, 1913.

Application filed November 24, 1911. Serial No. 662,098.

*To all whom it may concern:*

Be it known that I, HERMAN L. BIENER, a citizen of the United States, and a resident of the city of New York, borough of Manhattan, in the county and State of New York, have invented a new and Improved Vehicle-Tire, of which the following is a full, clear, and exact description.

The invention relates to vehicle tires such as shown and described in the application for Letters Patent of the United States, No. 571,945, filed by me on July 14, 1910.

The object of the present invention is to provide a new and improved vehicle tire for the wheels of automobiles and other vehicles, and arranged to provide the desired cushioning effect, without the use of the inflatable tubes, to render the tire punctureproof, and to permit of conveniently and quickly making repairs whenever it is necessary to do so.

In order to accomplish the desired result, the tire is made in sections arranged around the rim of the wheel, each section comprising a rim plate, a tread plate, and a plurality of springs interposed between the said plates.

A practical embodiment of the invention is represented in the accompanying drawings forming a part of this specification, in which similar characters of reference indicate corresponding parts in all of the views.

Figure 1 is a side elevation of a wheel provided with the improved tire, parts being shown in section; Fig. 2 is an enlarged sectional side elevation of one of the tire sections; Fig. 3 is an inverted plan view of the tread plate of one of the sections and the springs held thereon; and Fig. 4 is a cross section of the tire on the line 4—4 of Fig. 2.

On the hub A of a vehicle wheel radiate the spokes B connected with the felly, the felly being provided with a rim C having upwardly and inwardly extending side flanges C', as plainly indicated in Fig. 4. On the rim C of the wheel is arranged the wheel tire, made in sections alike in construction, and each having a rim plate D seated on the peripheral face of the rim C between the flanges C', as plainly indicated in Fig. 4, and the said rim plate D is connected at its middle by a bolt E with the rim C and felly of the wheel, as plainly indicated in Fig. 1. The outer face of the rim plate D is provided on opposite sides of the bolt E with seats D' for receiving one end of inner coil springs F, seated at their other ends in seats G' formed on the under face of a tread plate G, and each of the inner springs F is surrounded by an outer coil spring F' likewise seated on seats $D^2$ and $G^2$ formed on the plates D and G concentric with the seats D' and G'.

On the outer or peripheral face of the tread plate G fits a cushioning plate H, of rubber or other elastic material, and on the said cushioning plate H rests the tread section I, preferably made of layers of leather fastened together by rivets J having heads projecting beyond the peripheral face of the tread section I to render the tire nonskidding. The ends of the tread I for each section are provided with cut-out portions I', and into one of which fits a joint plate K secured in place by the end rivets or studs J, it being understood that the joint plate K extends beyond the side of one section of the tire to engage the corresponding cut-out portion I' of the next following section to cover up the joint of adjacent sections.

The springs F, F' of each section are normally held under a predetermined compression corresponding to the weight of the vehicle on which the tires are used, and in order to hold the said springs under this normal compression use is made of endless cables L connecting the rim plate D and the tread plate G with each other, the said cables engaging corresponding grooves $D^3$ and $G^3$ formed in the plates D and G near the ends thereof, as will be readily understood by reference to Figs. 2 and 3. By the use of the cables L the springs F and F' are held under the desired compression, and in case of an increase in the load and further compression of the springs F and F' the cables are ready to yield owing to their flexibility, but as soon as the load is reduced the cables stretch to the full extent and hold the springs F and F' under their normal compression.

In order to prevent dust, moisture and other extraneous matter from passing into a tire section use is made of a cover N, of leather or other suitable material, and having a lining of canvas or the like, the cover N being secured between some of the layers forming the tread section I by the use of the rivets or studs J, and the ends and bottom portion of the cover N are closed by the use of laces O, as plainly indicated in Fig. 4. The bottom portion of the cover N passes between the inner face of the rim plate D and the rim C, and in order to prevent undue chafing and cutting of the cover N, use is made of metallic studs P fastened to the bottom portion of the cover N. The studs P project on both faces of the bottom portion of the cover N so that the bottom portion is not in contact with the adjacent surfaces of the rim C and plate D but only the faces of the studs, and hence the bottom portion of the cover is not chafed.

From the foregoing it will be seen that the sections of the wheel tire are wholly independent one of the other and are removably secured to the rim C of the wheel by the bolt E and each section has its tread yieldingly supported so as to properly cushion the wheel, thus insuring easy riding of the persons in the automobile or other motor vehicle. It will also be noticed that each section of the wheel tire can be quickly removed whenever desired for repairs or other purposes, and each tire section is composed of comparatively few parts, not liable easily to get out of order.

Having thus described my invention, I claim as new and desire to secure by Letters Patent:—

1. A wheel tire made in sections arranged around the rim of the wheel, each section comprising a rim plate, a tread plate, a bolt connecting the middle of the rim plate with the wheel rim, springs interposed between the said rim plate and the said tread plate and arranged on opposite sides of the said attaching bolt, the said rim plate and tread plate being provided with corresponding grooves near the ends thereof, and endless cables passing around the said plates and engaging said grooves to hold the springs under compression.

2. A wheel tire made in sections arranged around the rim of the wheel, each section comprising a rim plate, a tread plate, springs interposed between the said plates, a bolt for connecting the middle of the rim plate with the wheel rim, a cushioning plate on the outer face of the said tread plate, a tread section overlying the said cushioning plate, the ends of each tread section being provided with recessed portions, a casing inclosing the tire section and attached to the said tread section, and a countersunk joint plate secured to one end of the tread section and projecting beyond the same for engagement with the recess in the end of the next following tread section.

3. A wheel tire made in sections arranged around the rim of the wheel, each section comprising a rim plate, a tread plate, a bolt connecting the said rim plate with the rim of the wheel, springs interposed between the said plates, a cushioning plate on the outer face of the said tread plate, a tread section made in layers, a cover inclosing the tire section and extending between layers of the said tread section, fastening means for fastening the tread layers together and at the same time securing the cover to the tread sections, a joint plate secured to one end of the tread section and projecting beyond the same for engagement with the next tire section, and laces for closing the ends and bottom portions of the said cover.

4. A wheel tire made in sections arranged around the rim of the wheel, each section comprising a rim plate, a tread plate, means for connecting the rim plate with the wheel rim, springs interposed between the rim plate and the tread plate, a cushioning plate on the outer face of the tread plate, a tread section made in layers, fastening devices for securing the layers of the tread section together and having heads projecting beyond the peripheral face of the tread section, the ends of the tread section being provided with recesses, and a joint plate engaging the recess at one end of the tread section and secured to said section by the end fastening devices for the tread layers, the said joint plate projecting beyond the tread section for engagement with a recess in the adjacent tread section.

5. A wheel tire made in sections arranged around the rim of the wheel, each section comprising a rim plate connected with the wheel rim, a tread plate, springs interposed between the said plates, means for holding the springs normally under compression, a cushioning plate on the outer face of the tread plate, a tread section made in layers, a cover inclosing the tire section, and extending between layers of the tread section, a portion of said cover passing between the inner face of the rim plate and the face of the wheel rim, and metallic protecting devices secured to the said portion of the cover and projecting beyond the faces thereof to engage the faces of the wheel rim and the rim plate.

In testimony whereof I have signed my name to this specification in the presence of two subscribing witnesses.

HERMAN L. BIENER.

Witnesses:
 THEO. G. HOSTER,
 PHILIP D. ROLLHAUS.

Copies of this patent may be obtained for five cents each, by addressing the "Commissioner of Patents, Washington, D. C."